J. T. MINAHAN.
TROLLEY.
APPLICATION FILED OCT. 27, 1908.
919,449.
Patented Apr. 27, 1909.
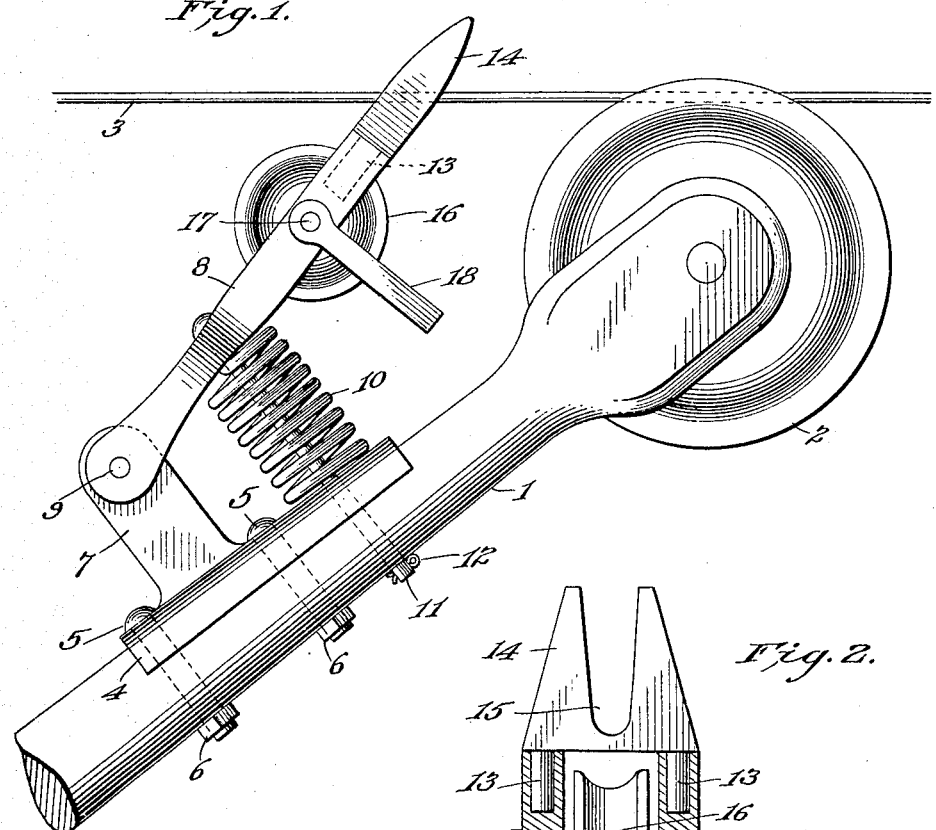
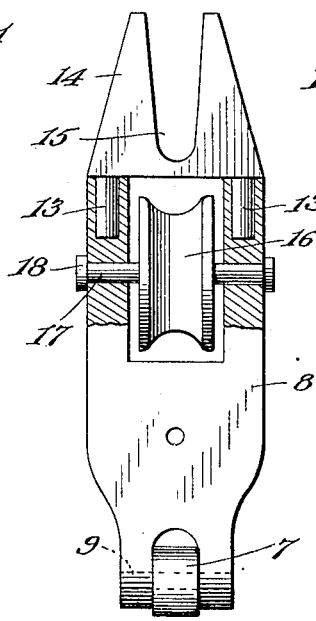
Witnesses
W. C. Lyddane
J. O. J. Mulhall
Inventor
Jeremiah T. Minahan
By Joshua R. H. Potts
Attorney

UNITED STATES PATENT OFFICE.

JEREMIAH T. MINAHAN, OF PHILADELPHIA, PENNSYLVANIA.

TROLLEY.

No. 919,449.    Specification of Letters Patent.    Patented April 27, 1909.

Application filed October 27, 1908. Serial No. 459,686.

*To all whom it may concern:*

Be it known that I, JEREMIAH T. MINAHAN, a citizen of the United States, residing at Philadelphia, in the county of Philadelphia and State of Pennsylvania, have invented certain new and useful Improvements in Trolleys, of which the following is a specification.

My invention relates to improvements in trolleys, and more particularly to an improved guard to steer the trolley wheel onto the wire should it jump therefrom, and also to provide an improved auxiliary wheel which will be in operation when the trolley pole assumes a low or almost horizontal position, due to the lowering of the trolley wire when passing under a bridge, through a tunnel, and the like.

A further object is to provide improved mounting on the trolley pole for the guard and auxiliary trolley wheel, and so construct the guard that its wearing end can be replaced when worn, with but slight expense.

With these and other objects in view the invention consists in certain novel features of construction, combinations and arrangements of parts as will be more fully hereinafter described and pointed out in the claims.

In the accompanying drawings Figure 1, is a view in side elevation illustrating my improvements, and Fig. 2, is a front elevation of the guard partly in section.

1 represents a trolley pole carrying at its free end an ordinary trolley wheel 2 to run upon a trolley wire 3, or other electric conductor. A bracket 4 having its base portion curved to correspond with the contour of the trolley pole is secured to the pole by bolts 5 and nuts 6 as clearly shown in Fig. 1, and is made with a post or standard 7 projecting at right angles to the base portion of the bracket 4, and on the forward side of the trolley pole to support my improved guard 8, as will now be explained.

The guard 8 is bifurcated at its lower end and straddles the post or standard 7, and is pivotally connected to said post by a pin 9, located in alined openings in the bifurcated end of the guard, and the post. A coil spring 10 is located between the bracket 4 and the guard 8, and surrounds a pin or rod 11 extending through the guard 8 and trolley pole 1, and this pin 11 is made with a head or enlargement at one end and secured by a cotter pin 12 or other device at its other end, to limit the movement of the guard away from the trolley pole, and the spring 10 normally exerts pressure on the guard 8 to force it away from the pole. The outer end of the guard is forked and provided in its forked ends with sockets or recesses to receive lugs 13 on a removable grooved wearing end 14. The groove 15 in this end 14 is adapted to receive the trolley wire 3, and guide the trolley wheel preventing accidental escape of the wheel 1 from the wire 3 under any ordinary conditions.

My improved auxiliary trolley wheel 16 is located in the forked end of guard 8 and supported on a pintle 17, the latter secured in the guard, and a bail 18 secured to the ends of this pintle 17 and held against swinging movement, is adapted to engage the trolley pole 1 and limit the movement of the guard toward the same when the auxiliary trolley wheel 16 is in operation, as will now be explained.

In the normal operation, the parts will be in the position shown in Fig. 1, with the wearing end 14 of the guard moving along the wire 3 in advance of the wheel 2 and serving to prevent sufficient lateral movement of the wheel 2 to escape from the wire. When the trolley reaches a point where the trolley wire drops down to a comparatively low level, such as is the case when passing through a tunnel, or below a bridge, the trolley pole 1 must assume an almost horizontal position, and in such case the auxiliary wheel 16 will run on the wire 3 and serve as the electric conductor to the motors of the car. When the auxiliary wheel is in operation, the pressure thereon will cause the stop 18 to bear against the pole 1 and prevent the contact of the guard with the trolley wheel 2.

The end 14 upon which the greatest wear naturally comes, is preferably made of Babbitt metal or other soft material, so as not to wear the trolley wire 3, and when this end 14 becomes unduly worn, it can be replaced by a new one at but small expense.

Slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what

I claim as new and desire to secure by Letters Patent is:

1. In a device of the character described, the combination with a trolley pole, a trolley wheel thereon, of a guard pivotally connected to the pole and disposed in advance of the trolley wheel, a spring normally pressing said guard away from the trolley wheel, an auxiliary trolley wheel carried by said guard and a device constructed to engage the trolley pole and limit the movement of the guard toward the trolley pole.

2. In a device of the character described, the combination with a trolley pole and a wheel thereon, of a bracket secured to said pole, a guard pivoted to said bracket and having a forked outer end, a removable wearing end on said guard having a groove or recess to receive the trolley wire and an auxiliary trolley wheel mounted within the forked end of the guard.

3. In a device of the character described, the combination with a trolley pole and a trolley wheel thereon, of a bracket secured to the trolley pole, a guard pivoted to said bracket and disposed in advance of the trolley wheel, a spring located between the guard and said bracket, a connecting device passing through said guard, spring, bracket and pole, enlargements at the ends of said connecting device to limit the movement of the guard away from the pole, an auxiliary trolley wheel carried by the guard, and a device secured to the guard and constructed to engage the pole and limit the movement of the guard toward the pole.

4. In a device of the character described, the combination with a trolley pole and a trolley wheel thereon, of a guard pivotally secured to the pole, a spring normally pressing the guard away from the pole, a removable end on the guard constructed of soft metal to engage the trolley wire, and lugs on said end constructed to enter sockets or notches in the guard and removably connect the end to the guard.

In testimony whereof I have signed my name to this specification in the presence of two subscribing witnesses.

JEREMIAH T. MINAHAN.

Witnesses:
R. H. KRENKEL,
J. A. L. MULHALL.